United States Patent Office … 3,234,180
Patented Feb. 8, 1966

3,234,180
SILOXY POLYMERS
Tse C. Wu, Waterford, N.Y., assignor to General Electric Company, a corporation of New York
No Drawing. Filed Aug. 1, 1963, Ser. No. 299,204
4 Claims. (Cl. 260—46.5)

This invention relates to useful polymeric silicone materials. More particularly, this invention relates to useful silicone polymers of high phenyl content and characterized by the presence of silicon-bonded hydrogen atoms.

It is generally known in the art that polysiloxanes of high phenyl content exhibit high strength and thermal stability as compared, for example, to methylpolysiloxanes. It is also generally known that the mechanical strength of polymeric materials can be improved by reducing slippage between chains. Finally, it is known that it is difficult to cross-link organopolysiloxanes of high phenyl content because of the extremely high stability of such materials.

The present invention is based on my discovery of a high phenyl polysiloxane of reduced chain slippage which can still be further reacted or cross-linked. More particularly, this invention relates to high phenyl polysiloxanes containing silicon-bonded triphenylsiloxy groups in the polymer chain and also containing silicon-bonded hydrogen atoms in the polymer chain.

The polymeric materials within the scope of the present invention have the formula, (1) 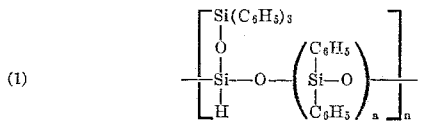

where $a$ is a whole number equal to from 0 to 2, inclusive, and $n$ has a value in excess of 1, e.g., up to 40 to 50, or more.

The polymeric materials within the scope of Formula 1 are characterized by the presence of a high percentage of silicon-bonded phenyl groups to impart thermal stability and mechanical strength and the presence of silicon-bonded hydrogen groups which provides sites for cross-linking polymer molecules. This cross-linking can be effected by reacting the polymeric material with a second material containing a plurality of silicon-bonded olefinic groups to permit the addition of the silicon-hydrogen linkage from the polymer of Formula 1 to the olefinic double bonds of second material to provide cross-linking. Typical of such cross-linking agents are 1,3-divinyltetramethyldisiloxane. The cross-linking is effected by reacting the two components in an amount sufficient to provide one silicon-bonded olefinic group or silicon-bonded hydrogen atom in the presence of a suitable catalyst such as a platinum compound or other suitable catalyst. Useful platinum catalysts are finely divided elemental platinum as well as platinum deposited on gamma alumina. Other suitable compounds for use as a catalyst in the cross-linking reaction are materials such as chloroplatinic acid. These catalysts are employed in an amount of from about 10 to 1,000 parts platinum per million parts of polysiloxane mixture being cross-linked. The cross-linking is effected by mixing the polymer within the scope of Formula 1, the olefinic material and the platinum catalyst and heating the mixture at an elevated temperature, e.g., a temperature of from about 50 to 100° C. for a time of from about ½ hour to 4 hours or more to produce cross-linked polymeric materials.

The polymeric materials of the present invention are prepared by a relatively straight forward procedure which varies with a particular polymeric material being employed. Thus, polymeric materials of Formula 1 where $a$ is zero, are prepared by the hydrolysis and condensation to triphenylsiloxydichlorosilane. This material is prepared by dissolving triphenylsiloxydichlorosilane in a suitable solvent, such as ether, in an amount of from 2 to 10 parts ether, per part of the silane. To the solution is added anhydrous sodium bicarbonate in an amount equal to about 2 moles per mole of the silane. This reaction can be effected at room temperature or at slightly elevated temperatures, such as temperatures of from 25 to 50° C. This hydrolysis and condensation produces the polymeric material as a solution in the reaction mixture which is filtered and the filtrate is stripped at reduced pressures to remove the solvent, resulting the desired polymeric material. The molecular weight of the material is in general a function of the temperature of the reaction, with the molecular weight increasing as the temperature of the reaction increases. The polymeric material produced by this process is chain-stopped generally with silicon-bonded chlorine atoms but because of the nature of the polymeric material, and its relatively high molecular weight, the presence of the chlorine chain-terminating groups can be ignored for practical purposes.

Polymeric materials within the scope of Formula 1 in which $a$ is equal to 1 or 2 are prepared by reacting triphenylsiloxydichlorosilane with either diphenylsilanediol or tetraphenyldisiloxanediol-1,3. In particular, equimolar amounts of triphenylsiloxydichlorosilane and either diphenylsilanediol or the tetraphenyldisiloxanediol-1,3, are reacted in solution, such as a tetrahydrofuran solution in the presence of hydrogen halide acceptor such as pyridine. The amount of solvent is generally from 2 to 10 parts by weight per part of the other reactants and the amount of hydrogen halide acceptor is generally present in an amount equal to about 2 moles, per mole of the triphenylsiloxydichlorosilane. The reaction is effected by merely adding the triphenylsiloxydichlorosilane to the other ingredients at a temperature which can vary from room temperature up to about 50° C. This results in a solution of the desired polymeric material in tetrahydrofuran or other solvent and the reaction mixture is filtered and the tetrahydrofuran is stripped from the reaction mixture to produce the desired polymer. Again the molecular weight of the polymer is a function of the temperature of the reaction mixture with the molecular weight increasing as the reaction temperature increases. The polymer chains are terminated by either silanol groups or silicon-bonded chlorine atoms depending upon which moiety of the polymeric material is at the end of the chain. However, because of the relatively high molecular weight of the polymeric materials, the chain terminating group can be disregarded for all practical purposes.

The following examples are illustrative of the practice of my invention and are not intended for purposes of limitation. All parts are by weight.

*Example 1*

Triphenylsiloxydichlorosilane was prepared by mixing together 240 parts of triphenylsilanol and 154 parts of silicochloroform and 900 parts of dry benzene and refluxing for six hours during which time a gentle stream of nitrogen was introduced to carry off the hydrogen chloride formed. The solvent was distilled off and the residue distilled in a vacuum to produce 247.8 parts (84% yield) of triphenylsiloxydichlorosilane boiling at 168 to 170° C. at 0.6 mm. of mercury. On standing, the product solidified to form fine crystals melting at 36° C. This product was used to prepare the new materials of this invention.

*Example 2*

Poly(triphenylsiloxy)siloxane was prepared by placing a solution containing 31.5 parts of triphenyl siloxydichlorosilane in 140 parts of ether in a three-necked flask at room temperature. To this there were added in very small increments 14.1 parts of sodium bicarbonate at regular intervals over a period of eight hours, evolution of gas being noticed at each addition. The mixture was filtered to remove the solid residue remaining and distillation of the filtrate produced a solid polymer within the scope of the present invention. The infrared spectrum of this product indicated an absorption band at 4.5µ very similar to that of $(HSiO_{1.5})_x$. There was a distinctive doublet at 14 to 14.3µ due to the presence of the triphenylsiloxy group. This product had the average formula:

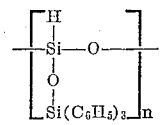

where *n* has an average value of about 30.

*Example 3*

A solution containing 37.5 parts of triphenylsiloxydichlorosilane in 135 parts of tetrahydrofuran was added dropwise to a solution containing 21.6 parts of diphenylsilanediol, 18 parts of pyridine and 180 parts of tetrahydrofuran at room temperature over a period of two hours. The reaction mixture was filtered to remove the white solids formed and distillation of the filtrate yielded a solid polymer within the scope of the present invention which had the formula:

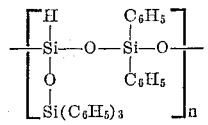

where *n* had an average value of about 25.

*Example 4*

To a 3-necked flask fitted with two graduated dropping funnels and a stirrer was added with stirring 140 parts of anhydrous ether and 6.4 parts of dry pyridine. A solution containing 8.3 parts of 1,1,3,3,-tetraphenyldisiloxanediol-1,3, in 35 parts of anhydrous ether was added from one funnel while another solution containing 7.5 parts of triphenylsiloxydichlorosilane in 35 parts of anhydrous ether was added from other funnel. The additions were carried out at about the same rate at room temperature over a period of about one hour. The reaction mixture was stirred five more hours after the addition had been completed. The reaction mixture was then filtered and the residue was refluxed for a short time with toluene, two liquid layers being formed. The top layer was separated and cooled to yield a white solid polymer within the scope of the present invention which melted at 270° C. This polymer had the formula:

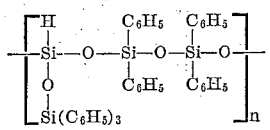

where *n* had an average value of about 5.

*Example 5*

This example illustrates the use of the polymeric materials of the present invention in encapsulating electronic components. Into a container is placed a transister printed circuit board. Into the container to a depth in excess of the circuit board is poured a solution of 271 parts of the polymer of Example 3, 93 parts of 1,3-divinyltetramethyldisiloxane, 500 parts ether and sufficient chloroplatinic acid to provide 1000 parts platinum per million parts of the polymer of Example 3. The system is then maintained under vacuum at room temperature to evaporate the ether and then heated at 90° C. for one hour to produce a circuit board completely encapsulated in a cured silicone polymer, which protects the circuit from damage.

What I claim as new and desire to secure by Letters Patent of the United States is:

1. A polymeric material having the formula:

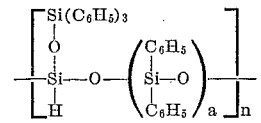

where *a* is a whole number equal to from 0 to 2, inclusive, and *n* has a value greater than 1 and up to 50.

2. A polymeric material having the formula:

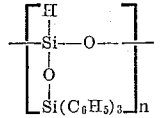

where *n* has an average value greater than 1 and up to 50.

3. A polymeric material having the fromula:

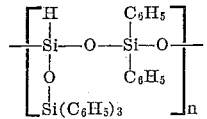

where *n* has a value greater than 1 and up to 50.

4. A polymeric material having the formula:

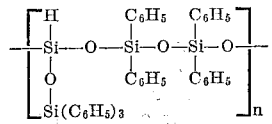

where *n* has a value greater than 1 and up to 50.

References Cited by the Examiner
UNITED STATES PATENTS
2,654,629   7/1953   Nitzsche ---------- 260—46.5

LEON J. BERCOVITZ, *Primary Examiner.*
SAMUEL H. BLECH, *Examiner.*